United States Patent [19]

Reynaud

[11] Patent Number: 4,878,054
[45] Date of Patent: Oct. 31, 1989

[54] METHOD AND DEVICE FOR REPRESENTING THE HORIZON ON BOARD AN AIRCRAFT

[75] Inventor: Jean M. Reynaud, Pertuis, France

[73] Assignee: Avions Marcel Dassault - Breguet Aviation, Vaucresson, France

[21] Appl. No.: 9,363
[22] PCT Filed: Apr. 18, 1986
[86] PCT No.: PCT/FR86/00130
 § 371 Date: Dec. 18, 1986
 § 102(e) Date: Dec. 18, 1986
[87] PCT Pub. No.: WO86/06160
 PCT Pub. Date: Oct. 23, 1986

[30] Foreign Application Priority Data
 Apr. 18, 1985 [FR] France ................ 85 05854

[51] Int. Cl.⁴ .............................................. G01C 23/00
[52] U.S. Cl. .................................. 340/975; 33/328; 340/971; 340/980; 364/434
[58] Field of Search ............ 340/967, 971, 974, 975, 340/980; 33/328–330; 73/178 R; 364/434, 424.01; 434/51, 54

[56] References Cited

U.S. PATENT DOCUMENTS

| 3,371,528 | 3/1968 | Sullivan | 33/329 |
| 3,737,846 | 6/1973 | Hernandez . | |
| 3,967,799 | 7/1976 | Muller | 340/975 |
| 4,019,702 | 4/1977 | Annin | 73/178 T |
| 4,147,056 | 4/1979 | Muller | 340/975 |
| 4,247,843 | 1/1981 | Miller et al. | 340/973 |
| 4,326,189 | 4/1982 | Crane | 340/975 |
| 4,390,950 | 6/1983 | Muller | 340/975 |
| 4,484,189 | 11/1984 | Dettmer | 340/974 |
| 4,513,509 | 4/1985 | Nordström | 340/974 |
| 4,583,094 | 4/1986 | Mosier | 340/975 |

FOREIGN PATENT DOCUMENTS

| 116022 | 8/1984 | European Pat. Off. . | |
| 1034135 | 6/1966 | United Kingdom . | |
| 2065053A | 6/1981 | United Kingdom | 340/980 |

Primary Examiner—Joseph A. Orsino
Assistant Examiner—Brent A. Swarthout
Attorney, Agent, or Firm—Watson, Cole, Grindle & Watson

[57] ABSTRACT

As a method and device for representing the horizon on board an aircraft, there is displayed on the cathode tube of a collimator an image comprising a circle of small size inside which there are, on the one hand, a horizon line inclined to the horizontal by an angle equal to but opposite the rolling angle of the aircraft, the horizon line being remote from the center of the circle by a distance which is a function of the pitching angle in the upward direction when the aircraft is diving and in the downward direction when the aircraft is pulling the nose up, and which delimits to zones of different brightness and, on the other hand, a point representing a pole situated on the median line of the horizon line at a distance from the latter corresponding to a pitching angle of 90°. A "head up" type control system is essentially provided.

12 Claims, 2 Drawing Sheets

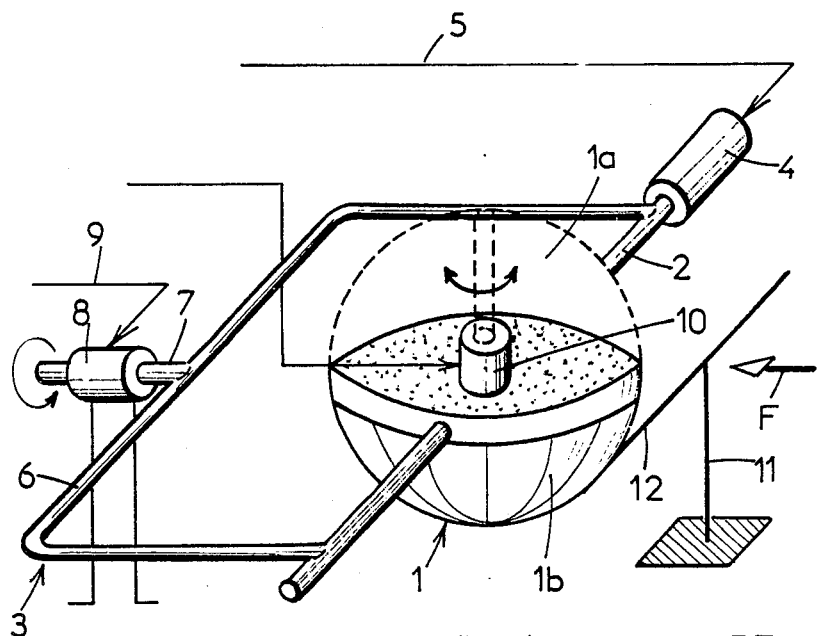
FIG. 1 (PRIOR ART)
(PRIOR ART)
FIG. 2A
(PRIOR ART)
FIG. 2B
(PRIOR ART)
FIG. 2C
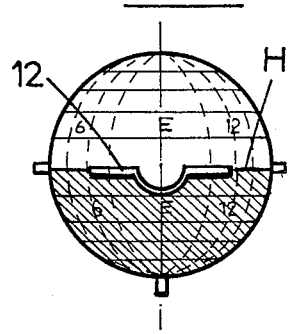
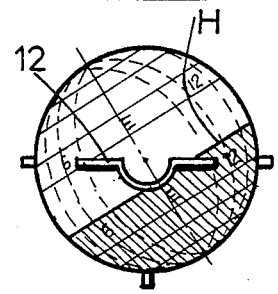
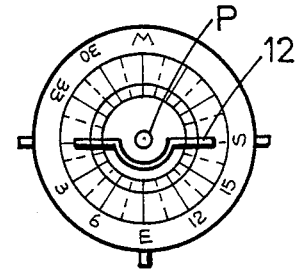

METHOD AND DEVICE FOR REPRESENTING THE HORIZON ON BOARD AN AIRCRAFT

BACKGROUND OF THE INVENTION

The present invention relates to a process and a device for representing the horizon on board an aircraft and, more particularly, a process and a device of this type which can be used in the flying aid system of the type known as "head up" which is found on board most modern aircraft.

It is known that the aircraft flying aid known as "head up" consists in projecting to infinity in front of the pilot's eyes symbols which can represent certain flight parameters of the aircraft in question, or even certain details of its environment. The pilot can thus know the information represented by various symbols, without having to consult the instrument panel of the aircraft or of its simulator, with the result that he can fly head up for most of the time. In addition, as the symbols are projected to infinity, the pilot has no need to make eye accommodation efforts in order to take note of the information that they represent.

The optical projection is therefore carried out by a device called a "head up collimator" which in particular includes a display device like, for example, a cathode ray tube, and optical devices enabling the projection of its screen to infinity to be carried out.

A "head up" flying aid system therefore includes several sensors of flight parameters connected to a processing and transmission chain which ends in a generator of symbols representing the parameters in question. It is this symbols generator itself which controls the collimator's display device which is most often a cathode ray tube.

More particularly as regards the representing of the horizon, the parameters whose values are detected by the sensors are the angles of pitch $\theta$, roll $\phi$ and heading $\psi$, as well as the roll and pitch velocities referenced p and q, respectively.

Instruments are known which permit the representation of the land horizon on board an aircraft with respect to the position of the aircraft. These devices usually include a sphere or a cylinder slaved to the angles of pitch, roll and heading. The two halves, in the case of a sphere the two hemispheres, are of different colors, the upper part generally being blue and the lower part maroon or black. Only the front surface of the sphere is visible, which permits, by appreciation of the quantity of blue or maroon seen by the observer, and by considering the orientation of the line of separation between the two hemispheres, the evaluation of the angles of pitch and roll of the aircraft. Graduated lines marked on the sphere also enable more accurate information to be obtained by reference to a fixed mark representing the axes of the aircraft.

The image which the observer receives from the sphere which forms the basic element of the traditional instrument described above is also known to be transposed onto a cathode ray tube. However, such a transposition cannot be carried out in the case of a "head up" collimator as the cathode ray tubes of such devices are monochromatic, such that, obviously, it is impossible to reproduce on their screen the blue and maroon or black areas formed by the sphere or cylinder of known devices. Moreover, an additional obstacle also comes from the fact that the image supplied by the cathode ray tube must not be overloaded in order that the cathode ray tube can present information other than the representation of the horizon and so that other symbols can be read through this representation of the horizon and so that the external terrain can also be seen.

In order to palliate these difficulties, it has also been proposed to represent the horizon on the cathode ray tube of a "head up" collimator by a line whose inclination with respect to the horizontal corresponds with the roll angle, while the pitch angle is represented by marks which become more separated from the line representing the horizon as this angle becomes larger, two different types of configuration given to these marks enabling the sign of the pitch angle to be distinguished, and thereby determining whether the aircraft is in the process of nosing down or of nosing up.

This solution is a last resort as the marks corresponding to the angles of pitch are hardly visible and there is a real risk of confusion between those of these marks which correspond to an aircraft in nose up and those which appear when this aircraft is in the process of nosing down, particularly when the horizon line is not visible or again in the case of a flight simulator where the pilot does not feel the physical sensation of the position of his aircraft. An additional disadvantage appears when the roll and pitch angles become high in value as it can arise that the marks in question purely and simply disappear from the screen of the "head up" collimator.

SUMMARY OF THE INVENTION

The purpose of the invention is to palliate these disadvantages and it is achieved by means of a process for representing the horizon on board aircraft according to which there is displayed on the cathode ray tube of a collimator, inside a circle of small dimension, on the one hand a horizon line which is inclined to the horizontal by an angle equal to the roll angle of the aircraft but of opposite sign which is distant from the centre of the circle by a distance proportional to the pitch angle, towards the top when the aircraft is nose down and towards the bottom when it is in the process of nosing up, and which delimits two areas of different luminosities and, on the other hand, a point representing a pole which is situated on the median of the horizon line at a distance from that line corresponding to a pitch angle of 90 degrees.

It is understood that this type of display provides a similar image to that of the spheres of the traditional devices whose principle has been reviewed above, the presence of a point representing a pole ensuring, during transitions to the vertical, continuity in the information supplied to the pilot concerning the manoeuvres in progress. Preferably, the diameter of the circle appearing to the pilot within which the horizon line and the point representing a pole are drawn is between 10 and 30 milliradians and, advantageously, it is in the order of 20 milliradians, which prevents the overloading of the image provided by the collimator, this display of the horizon, however, remaining perfectly readable.

According to an advantageous embodiment of this process, the image concerned appears on the screen of the collimator only if the absolute values of the roll and pitch angles are respectively greater than predetermined limit values and, preferably, if in addition, the absolute values of the roll and pitch velocities are also respectively greater than predetermined limit values.

The present invention also relates to a device for the implementation of the process specified above, a device which includes sensors providing two signals which depend on the roll angle and the pitch angle respectively and which are delivered to a symbols generator, this generator providing a collimator with signals corresponding to the above specified display image.

Preferably, this device also includes presentation logic asssociated with the symbols generator and supplying the latter with signals interrupting its functioning when the absolute value of the roll angle and that of the pitch angle are respectively below predetermined limit values. Advantageously, this device also includes sensors providing two signals which depend, respectively, on the roll velocity and the pitch velocity and which are delivered to the presentation logic by inserting switching signals into the symbols generator interrupting its functioning when the absolute value of the roll velocity and that of the pitch velocity are respectively over predetermined limit values.

The following description which is in no way limiting will allow a good understanding of how the present invention can be put into practice. It must be read with reference to the appended figures in which:

BRIEF DESCRIPTION OF THE DRAWINGS

FIG. 1 shows a very diagrammatic perspective view of the sphere which represents the horizon in traditional instruments;

FIGS. 2A to 2C show, also diagrammatically, what an observer sees of the sphere in FIG. 1 for three different positions of the aircraft;

DETAILED DESCRIPTION OF THE INVENTION

Figure 3:
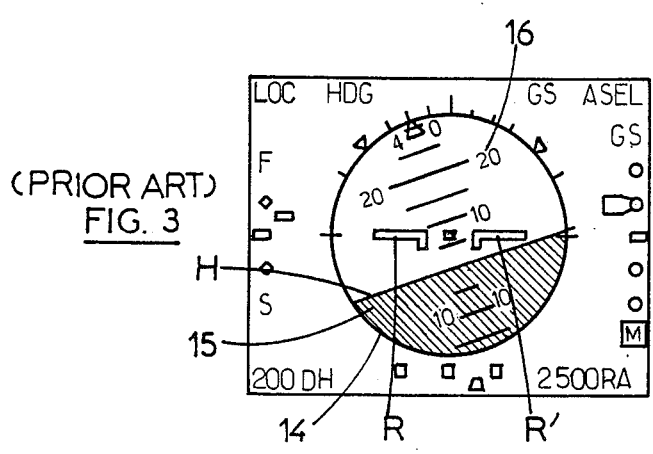
FIG. 3 shows the screen of a cathode ray tube containing the traditional transposition of the image supplied by the sphere in FIG. 1.

Traditional devices permitting the representation of the horizon on board an aircraft generally use a sphere similar to that shown diagrammatically at 1 in FIG. 1. This sphere is integral with a spindle 2 which passes through its centre and which is part of a frame 3 surrounding it with its other three sides. An extension of the spindle 2 is coupled to a motor 4 which can drive it in rotation and which is slaved to the pitch angle θ by means of a sensor, which is not shown, and a transmission line shown diagrammatically at 5. The side 6 of the frame 3 which is opposite the spindle 2 is extended towards the exterior and its middle by a spindle 7 coupled to a motor 8 capable of driving it in rotation and, consequently, of turning the sphere 1 about an axis perpendicular to the spindle 2, the motor 8 being connected by aline 9 to a sensor, not shown, which delivers a roll angle φ control signal. The device also includes a heading motor 10 which can turn the sphere 1 about an axis perpendicular to the frame 3 and an adjustable model 11 which diagrammatically represents the aircraft and which includes a horizontal bar 12 to represent the aircraft. Finally, the surface of the sphere 1 contains graduated meridians and parallels which allow evaluation of the value of roll, pitch and heading angles with a good degree of approximation.

FIGS. 2A to 2C show what is seen by an observer who looks at the sphere 1 of FIG. 1 in the direction of the arrow F which is situated in the extension of the spindle 8 and at the height of the bar 12 of the model 11. The case of FIG. 2A is that of horizontal flight: the horizon line H is merged with the horizontal mark 12 of the adjustable model 11. In the case of a bank to the right with a roll angle equal to 30 degrees, the trajectory of the aircraft remaining in a horizontal plane (FIG. 2B), the horizon line H makes an angle of +30°, in the trigonometric sense of the term, with the horizontal mark 12. As the upper hemisphere 1a of the sphere 1 (FIG. 1) is painted blue and its lower hemisphere 1b is painted black or maroon as has been mentioned above, it is possible to appreciate the pitch and roll of the aircraft by evaluation of the quantity of blue and of maroon and by the orientation of the line of separation H. Finally, when the aircraft goes to the vertical (FIG. 2C), the observer sees nothing more than a pole P, the rest of the image being blue or maroon (or black) depending on whether it is a nose down or a nose up.

As mentioned above, it has already been proposed to transpose the images of the type of those in FIGS. 2A to 2C onto a cathode ray tube. A representation similar to that of FIG. 3 is then obtained with a large circle 14 which practically fills the whole of the screen and which is the image of the contour of the sphere 1 in FIG. 1, with a horizon line H inside the circle 14, with marks R and R' corresponding to the bar 12 of FIG. 1 and with two areas 15 and 16 on either side of the horizon line H which extends to the circle 14.

In order to palliate the disadvantages of such a solution reviewed above, and according to the invention, the circle 14 of FIG. 3 is reduced until its apparent diameter is in the order of 20 milliradians, its diameter then being generally contained between 30 and 80 millimeters. In addition there is added to it the representation in the form of a point P of that of the poles which would be seen on the traditional instrument in FIG. 1 for the considered position of the aircraft. The cases of FIGS. 4A to 4F correspond to the following situations:

4A: horizontal flight where the pitch and roll angles are both zero. The horizon line H is horizontal and divides the circle 18 into two equal halves.

4B: the aircraft banks to the right, its wings making an angle of 40 degrees to the horizontal and it is in the process of nosing up. The horizon line H makes an angle of +40° with the horizontal and it is shifted downwards by an amount corresponding to the nose up angle. The north pole PN appears at the top of the screen on the median of the line H.

Figure 4:
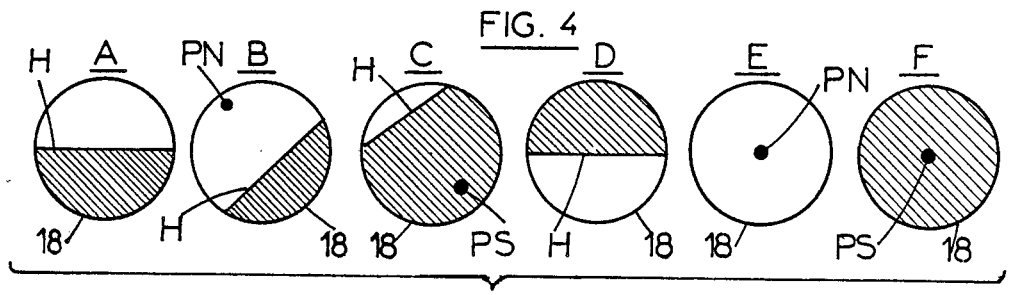
FIGS. 4A to 4F show the display circle of the present invention for six different positions of the aircraft.

4C: situation similar to that of FIG. 4B but this time the aircraft is in nose down. It is therefore the south pole PS which appears in the lower section of the figure.

4D: inverted flight. The horizon line H passes through the centre of the circle 18 and it is horizontal, the dark area of the lower hemisphere this time being above the line H.

4E: transition to the vertical in nose up. The image contains nothing more than a point PN representing the north pole.

4F: transition to the vertical in the nose down position. This time it is the south pole PS which appears on the image in the centre of a dark area corresponding to the lower hemisphere 1b of the sphere 1 of FIG. 1.

Figure 5:
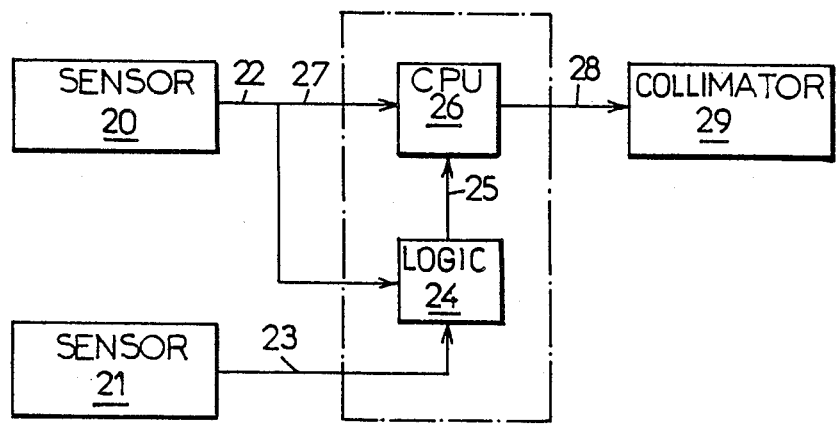
FIG. 5 is a very diagrammatic representation of the device implementing the present invention.

FIG. 5 is a very diagrammatic representation of an electronic device allowing the production of the image which has just been described with respect to FIGS. 4A to 4F. This device firstly includes two groups of sensors 20, 21 providing, respectively, angular data corresponding to the roll and pitch angles and, on the other hand, gyrometric data which are the roll p and pitch q velocities. The angular data can be provided by an inertia data system or by a heading and vertical data system, while the gyrometric data can be obtained by derivation of the roll and pitch angles coming from a platform inertia data system or from a heading and vertical data system, or again by an inertia data system with associated components or finally by gyrometric sensors which are for example those existing for the flight controls. The data coming from the groups of sensors 20 and 21 are inserted by means of lines 22 and 23, respectively, into a presentation logic 24 which is connected by a line 25 to a plotting computer 26 and which provides this computer with a switching signal putting it out of service when the absolute values of the roll and pitch angles on the one hand and of the corresponding velocities on the other hand are greater than predetermined limit values. In addition, the group of angular data sensors 20 is directly connected to the plotting computer 26 by a line 27.

The assembly formed by the presentation logic 24, the line 25 and the computer 26 forms a symbols generator unit which, by means of a line 28, delivers signals providing an image similar to those of FIGS. 4A to 4F to the "head up" collimator 29.

It is clear that, without going outside the scope of the present invention, it would be possible to make various modifications to the embodiment that has just been described. In this way, for example, it would be possible to produce the device in FIG. 5 in the form of an instrument panel display with a cathode ray tube or a flat screen whose diameter could be between 30 and 80 millimeters.

I claim:

1. A method for representing the horizon on board an aircraft, comprising providing a collimator having a cathode ray tube, displaying an image on said cathode ray tube of said collimator comprising a circle of such a diameter as capable of being seen by a pilot under an angle which is between 10 and 30 milliradians, said circle including a horizon line which is inclined to the horizontal by an angle equal but opposite to the roll angle of the aircraft, which is distant from the center of the circle by a distance that depends on the pitch angle, towards the top when the aircraft is nose down and towards the bottom when it is in the process of nosing up, and which delimits two areas of different luminosities, and said circle further including a point representing a pole which is situated on the median line of the horizon line at a constant distance from said horizon line, said distance being such that upon aircraft movement during flight, when the horizon line divides said circle into two equal halves, said point is absent from the circle, and that, when the horizon line leaves the circle, said point is located on the center of said circle.

2. A method according to claim 1, wherein said image appears on the screen of the collimator only if the absolute values of the roll and pitch angles are respectively smaller than predetermined limit values.

3. A method according to claim 2, wherein said image appears on the screen of the collimator only if, in addition, the absolute values of the roll velocity and pitch velocity are respectively smaller than predetermined limit values.

4. A method according to claim 1, comprising using sensors providing two signals which depend on the roll angle and the pitch angle respectively and which are delivered to a symbols generator, the latter providing a collimator with signals corresponding to the above specified display image.

5. A method according to claim 4, further comprising using a presentation logic associated with said symbols generator and supplying that generator with switching signals interrupting the functioning of said generator when the absolute value of the roll angle and that of the pitch angle respectively exceed predetermined limit values.

6. A method according to claim 5, further comprising using sensors providing two signals which depend respectively on the roll velocity and the pitch velocity and which are delivered to said presentation logic, this logic supplying the symbols genertor with switching signals interrupting the functioning of said generator when the pitch velocity, respectively, exceed predetermined limit values.

7. A device for representing the horizon on board aircraft, comprising a group of sensors which provides angular data corresponding to the roll and pitch angles; a group of sensors which provides gyrometric data which are the roll and pitch velocities; logic circuit connected to said groups of sensors for receiving said angular and gyrometric data and which generates a switching signal which commands putting said logic circuit out of service when the absolute values of the roll and pitch angles and the corresponding velocities are lower than predetermined values; a plotting computer which is directly connected to the group of angular data sensors for receiving said angular data and for receiving said switching signal which commands putting said plotting computer out of service; said plotting computer and said logic circuit comprising a symbols generator unit which generates image signals, and a "head up" collimator which produces visible images including a horizon line in response to said image signals.

8. A device according to claim 7, wherein said group of sensors providing angular data are part of an inertia data system.

9. A device according to claim 7, wherein said group of sensors providing angular data are part of a heading and vertical data system.

10. A device according to claim 7, wherein said group of sensors providing gyrometric data comprise means for mathematically derivating roll and pitch angles coming from a platform inertia system.

11. A device according to claim 7, wherein said group of sensors providing gyrometric data comprise means for mathematically derivating roll and pitch angles coming from a heading and vertical data system.

12. A device according to claim 7, wherein said group of sensors providing gyrometric data are aboard said aircraft gyrometric sensors existing for the flight control.

* * * * *